US011080711B2

(12) United States Patent
Levy et al.

(10) Patent No.: US 11,080,711 B2
(45) Date of Patent: Aug. 3, 2021

(54) COMPUTERIZED TRANSACTION ROUTING SYSTEM AND METHODS USEFUL IN CONJUNCTION THEREWITH

(71) Applicant: ZOOZ MOBILE LTD., Kfar Saba (IL)

(72) Inventors: Oren Levy, Raanana (IL); Ronen Morecki, Kfar Saba (IL); Ben Yaniv Chechik, Yarhiv (IL)

(73) Assignee: ZOOZ MOBILE LTD., Kfar Saba (IL)

( * ) Notice: Subject to any disclaimer, the term of this patent is extended or adjusted under 35 U.S.C. 154(b) by 394 days.

(21) Appl. No.: 15/524,588

(22) PCT Filed: Nov. 24, 2015

(86) PCT No.: PCT/IL2015/051137
§ 371 (c)(1),
(2) Date: May 4, 2017

(87) PCT Pub. No.: WO2016/084074
PCT Pub. Date: Jun. 2, 2016

(65) Prior Publication Data
US 2017/0364915 A1    Dec. 21, 2017

Related U.S. Application Data

(60) Provisional application No. 62/083,431, filed on Nov. 24, 2014.

(51) Int. Cl.
*G06Q 40/00* (2012.01)
*G06Q 20/40* (2012.01)
(Continued)

(52) U.S. Cl.
CPC ....... *G06Q 20/405* (2013.01); *G06Q 10/0639* (2013.01); *G06Q 10/06395* (2013.01);
(Continued)

(58) Field of Classification Search
CPC ...... G06Q 20/405; G06Q 20/22; G06Q 30/06; G06Q 10/06395; G06Q 10/0639;
(Continued)

(56) References Cited

U.S. PATENT DOCUMENTS 5,864,679 A    1/1999  Kanai et al.
6,230,145 B1 *  5/2001  Verderamo ............ G06Q 20/10
                                            705/35
(Continued)

FOREIGN PATENT DOCUMENTS

WO    WO-2005094442 A3 *  1/2007  ........... G06Q 20/405

OTHER PUBLICATIONS

Sarr et al: "Failure-Tolerant Transaction Routing at Large Scale", 2010 Second International Conference on Advances in Databases, Knowledge, and Data Application. (Year: 2010).*
(Continued)

*Primary Examiner* — Edward J Baird
(74) *Attorney, Agent, or Firm* — Buckley, Maschoff & Talwalkar LLC

(57) ABSTRACT

A computer-implemented transaction routing system including: a rule engine operative for receiving a flow of transaction data entities, using a processor for applying pre-imposed routing rules and determining routing of each data entity for which at least one pre-imposed routing rule is true to an external payment processor selected using the pre-imposed routing rule; and a transaction processing analyzer operative to accumulate data characterizing current handling by respective payment processors of at least transaction data entities routed to the respective payment processors by this system to maintain, by using a processor to compute, from the data, current statistics quantifying at least one handling aspect quality characterizing each of the plurality of supported payment processors, and to route at least each trans-
(Continued)

action data entity for which no pre-imposed routing-rules are true to a "best" payment processor selected by applying predetermined aspect combining criteria which prioritize the aspects to the current statistics.

14 Claims, 2 Drawing Sheets

(51) Int. Cl.
*G06Q 30/06* (2012.01)
*G06Q 10/06* (2012.01)
*H04L 29/08* (2006.01)
*H04L 29/06* (2006.01)
*G06Q 20/22* (2012.01)

(52) U.S. Cl.
CPC ............. *G06Q 20/22* (2013.01); *G06Q 30/06* (2013.01); *H04L 67/02* (2013.01); *H04L 67/025* (2013.01); *H04L 67/322* (2013.01); *H04L 67/42* (2013.01)

(58) Field of Classification Search
CPC ....... H04L 67/322; H04L 67/02; H04L 67/42; H04L 67/025
USPC ...................................................... 705/35–40
See application file for complete search history.

(56) References Cited

U.S. PATENT DOCUMENTS

| | | | |
|---|---|---|---|
| 7,959,074 B1* | 6/2011 | Chopra | G06Q 20/405 235/375 |
| 2001/0052016 A1* | 12/2001 | Skene | H04L 67/1019 709/226 |
| 2005/0033595 A1* | 2/2005 | Bonini | G06Q 30/02 705/35 |
| 2005/0114367 A1* | 5/2005 | Serebrennikov | G06F 16/951 |
| 2007/0005774 A1 | 1/2007 | Singh et al. | |
| 2007/0112579 A1* | 5/2007 | Ratnakaran | G06Q 30/06 705/1.1 |
| 2007/0156726 A1* | 7/2007 | Levy | G06F 21/10 |
| 2007/0233603 A1 | 10/2007 | Schmidgal et al. | |
| 2010/0266115 A1* | 10/2010 | Fedorov | H04M 3/5191 379/265.12 |
| 2011/0101091 A1* | 5/2011 | Fernandez | G06Q 20/204 235/380 |
| 2015/0221025 A1* | 8/2015 | Canis | G06Q 40/00 705/35 |
| 2016/0086284 A1* | 3/2016 | Ghosh | G06Q 40/08 705/4 |

OTHER PUBLICATIONS

European Office Action dated Oct. 26, 2020 which was issued in connection with a counter part application EP 15812893.4.

* cited by examiner

FIG. 2 a. human programmers on behalf of each of a plurality of users e.g. merchants conducting e-commerce via apps or websites set up merchant-rules for each merchant, using merchant-rule generating UI e.g. to conform to a merchant's prior agreements with specific payment processors.

b. one of a population of end-users presents credit card to merchant or other computerized entity, or otherwise initiates a transaction with the merchant/entity.

c. responsively, the merchant generates a transaction data entity having data components for storing transaction components/ particulars.

d. merchant sends the transaction data entity (or certain transaction data entity components, e.g. Transaction Id, Amount, tax, Fees, Invoice particulars, user particulars, credit card particulars) to the platform of Fig. 1. The transaction data entity is received by the rule engine.

e. rule engine routes certain transactions (typically, all transactions to which at least one merchant-defined or other legacy rule applies) to external payment processors accordingly. Transactions are passed from the rule engine to an internal intelligent payment routing subsystem

f. The transaction processing analyzer uses system-rules to route each transaction not routed by the rule engine, to one of the payment processors.

COMPUTERIZED TRANSACTION ROUTING SYSTEM AND METHODS USEFUL IN CONJUNCTION THEREWITH

REFERENCE TO CO-PENDING APPLICATIONS

Priority is claimed from U.S. Provisional Patent Application No. 62/083,431 entitled "Computerized transaction routing system and methods useful in conjunction therewith" and filed 24 Nov. 2014.

FIELD OF THIS DISCLOSURE

The present invention relates generally to transactions between computerized entities and more particularly to routing transactions to a selected one of several computerized entities.

BACKGROUND FOR THIS DISCLOSURE

Transactions between computerized entities are common. The Acceptance rate is the % of a specific universe of transactions which a particular acquirer accepts i.e. agrees to process (e.g. process e-payment for); as opposed to declining same i.e. refusing to process. The universe of transactions may be all transactions presented to the acquirer or subsets of that universe. If certain checks fail, a Declined Response is sent from the Acquirer, typically to a website or Point-of-Sale terminal; the merchant then declines the Transaction. Acceptance rates may disregard declines stemming from wrongly entered data (e.g. the card number was wrongly typed in).

Rete algorithms are known. If an expert system were to naively check each rule against a given data element, then on to the next rule and eventually looping back to the first rule, when finished, the system would perform slowly. A Rete-based expert system prevents this by building a network along with new facts, as they are asserted and/or modified, propagate. Nodes in the network are annotated when a specific fact matches a specific pattern associated with the node. When one or more facts combined cause all patterns for a given rule R to be satisfied, a leaf node is reached which triggers rule R The Rete algorithm is typically operative to sacrifice memory for speed and is generally unaffected by the number of rules in the system although the original Rete algorithm may cause memory consumption problems in very large expert systems. Consequently, newer Rete techniques (variations and alternatives of the original, such as but not limited to Rete* or Collection-Oriented Match) have been developed which require less memory.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system and method for expeditiously processing many, e.g. millions, of e-transactions using computerized technology. Processing is effectively accelerated, in terms of average response time per transaction, while simultaneously, legacy commitments to specific processors are honored. Typically, average response time per transaction improves on two levels:

a. directly, due to direct monitoring of payment processors for response time allowing payment processors to be selected on this basis, and b. indirectly; payment providers are monitored for acceptance rate hence may be selected on this basis, and enhanced acceptance rate translates into effectively accelerated performance since less transactions need to be re-routed to a second payment processor due to an earlier payment processor's decision not to accept the transaction. Enhanced acceptance rate may be ensured e.g. if the logic employed by the analyzer routes transactions to payment processors whose current acceptance rate, either globally or for transactions similar to a current transaction, is higher than other payment processors' current acceptance rates.

There is thus provided at least the following embodiments:

Embodiment 1. A computer-implemented transaction routing system comprising:

a rule engine operative for receiving a flow of transaction data entities, using a processor for applying pre-imposed routing rules if available and determining routing, of each transaction data entity for which at least one pre-imposed routing rule is true, to an external payment processor selected from among a plurality of supported payment processors by said at least one pre-imposed routing rule; and a transaction processing analyzer, typically AI-based, operative to accumulate data characterizing current handling, by respective payment processors from among the plurality of supported payment processors, of at least transaction data entities routed to said respective payment processors by this system, to maintain, by computing, from said data, current statistics quantifying at least one aspect of handling quality characterizing each of the plurality of supported payment processors, and to route at least each transaction data entity for which no pre-imposed routing-rules are true, to a "best" payment processor selected from among said plurality of supported payment processors by applying predetermined aspect combining criteria which prioritize said aspects, to said current statistics.

For example, the criteria may indicate that one aspect is more important than another e.g. that preserving up-status is more important than preserving a high acceptance rate or conversely, that that preserving up-status is less important than preserving a high acceptance rate hence should only be taken into account in choosing between payment processors with equal acceptance rate. Or, criteria may indicate a more complex logical relationship between aspects e.g. that preserving up-status is to be used to select the payment processor, once it has been ensured that the acceptance rate is at least a predetermined threshold value.

Aspects may include, for example, any of the following: technical aspects such as acceptance rate or decline rate, response time, up/down time or other aspects such as fees.

Embodiment 2. A system according to any of the preceding embodiments wherein said aspect comprises acceptance rate and wherein said statistics quantifying said aspect include a current acceptance rate for each of the plurality of supported payment processors.

It is appreciated that the acceptance rate may be defined as a decline rate e.g. instead of monitoring % of incoming transactions which are accepted, the system may monitor % of incoming transactions which are declined. Typically, acceptance rate statistics are accumulated per-credit card type (e.g. separately for Mastercard, Visa and Diners).

Embodiment 3. A system according to any of the preceding embodiments wherein said aspect comprises up/down status and said statistics quantifying said aspect include binary up/down status statistics indicating whether each of the plurality of supported payment processors is or is not currently operational ("up").

Embodiment 4. A system according to any of the preceding embodiments wherein said current statistics comprise response-time statistics comprising at least one statistic characterizing a distribution of an individual payment processor's response times to incoming transactions.

The at least one statistic may for example comprise a central tendency (mean, mode, median). Response times may be computed using time-stamps from the relevant server's physical clock e.g. by comparing the time-stamp of the time a transaction was sent to an individual payment processor to the time-stamp of the time a response to that transaction was received from that payment processor.

Embodiment 5. A system according to any of the preceding embodiments wherein said typically AI-based transaction processing analyzer is operative to accumulate data characterizing current handling of each individual transaction data entity by said processors, by proactively requesting data characterizing current handling of each individual transaction data entity from said processors.

Embodiment 6. A system according to any of the preceding embodiments wherein said typically AI-based transaction processing analyzer is operative to accumulate data characterizing current handling of each individual transaction data entity by said processors, by generating API calls to said processors.

For example, the analyzer may accumulate binary up/down status statistics by sending API calls, on occasion e.g. at random intervals or upon being triggered, or periodically (e.g. each 10-100 milliseconds or each 1-10 sec), to each payment processor and setting a payment processor's up/down status as "down" or "up" if a predetermined number of consecutive API calls respectively receive or fail to receive a response from said payment processor. Typically, if an API call fails to receive a response within a predetermined time period, another API call is immediately sent out, until a predetermined number of API call attempts (e.g. 3) has been made.

Embodiment 7. A system according to any of the preceding embodiments wherein said binary up/down status statistics are accumulated by sending API calls, to each payment processor and setting a payment processor's up/down status as "down" or "up" if a predetermined number of consecutive API calls respectively receive or fail to receive, respectively, a response from said payment processor.

Embodiment 8. A system according to any of the preceding embodiments wherein if an API call fails to receive a response from a payment processor within a predetermined time period, another API call is immediately sent out to said processor, until a predetermined number of API call attempts has been made at which point the payment processor is assumed to be in a down-state.

Embodiment 9. A system according to any of the preceding embodiments wherein the transaction processing analyzer includes a Bayesian algorithm which inputs a plurality of parameters characterizing each individual transaction and at least one parameter characterizing each of at least some of said plurality of supported payment processors and outputs a best processor from among said supported processors to which the individual transaction is to be routed.

Embodiment 10. A system according to any of the preceding embodiments and also comprising a user interface allowing at least one e-commerce merchant to define and store its own pre-imposed routing rules in computer storage accessible to said rule engine.

The user interface may for example present a table like screen display with rules-to-be and the merchant drag-and-drops elements into the rules-to-be, e.g. when TransactionAmount>$1000 do actionx, where each underlined element is one selected or otherwise provided by the merchant. Typically, recommended rule formats are displayed to the merchant e.g. "send transactions (WITH PARAMETERS SUCH AND SUCH) to payment processor with highest acceptance rate as estimated from transactions accumulated in the past (PARAMETER) days" or "send transactions (WITH PARAMETERS SUCH AND SUCH) to payment processor with fastest processing time as estimated from transactions accumulated in the past (PARAMETER) days".

Embodiment 11. A system according to any of the preceding embodiments wherein at least one of said pre-imposed routing rules has the form: if [CONDITION/s ON characteristic/s of transaction and/or of payment processor] =true, route transaction data entity to [system-supported payment processor].

Embodiment 12. A system according to any of the preceding embodiments wherein said API calls are sent periodically to each payment processor.

Embodiment 13: A computer-implemented transaction routing method comprising receiving a flow of transaction data entities, using a processor for applying pre-imposed routing rules if available and determining routing, of each transaction data entity for which at least one pre-imposed routing rule is true, to an external payment processor selected from among a plurality of supported payment processors by said at least one pre-imposed routing rule; and accumulating data characterizing current handling, by respective payment processors from among the plurality of supported payment processors, of at least transaction data entities routed to said respective payment processors by this system, maintaining, by using a processor to compute, from said data, current statistics quantifying at least one aspect of handling quality characterizing each of the plurality of supported payment processors, and routing at least each transaction data entity for which no pre-imposed routing-rules are true, to a "best" payment processor selected from among said plurality of supported payment processors by applying predetermined aspect combining criteria which prioritize said aspects, to said current statistics.

Embodiment 14: A computer program product, comprising a non-transitory tangible computer readable medium having computer readable program code embodied therein, said computer readable program code adapted to be executed to implement methods herein such as the above methods.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor's, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to steps of flowcharts, may be performed by at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably, e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIG. 2 is a simplified flowchart illustration of a method for transaction routing. The method of FIG. typically comprises some or all of the illustrated steps, suitably ordered e.g. as shown.

Figure 1:
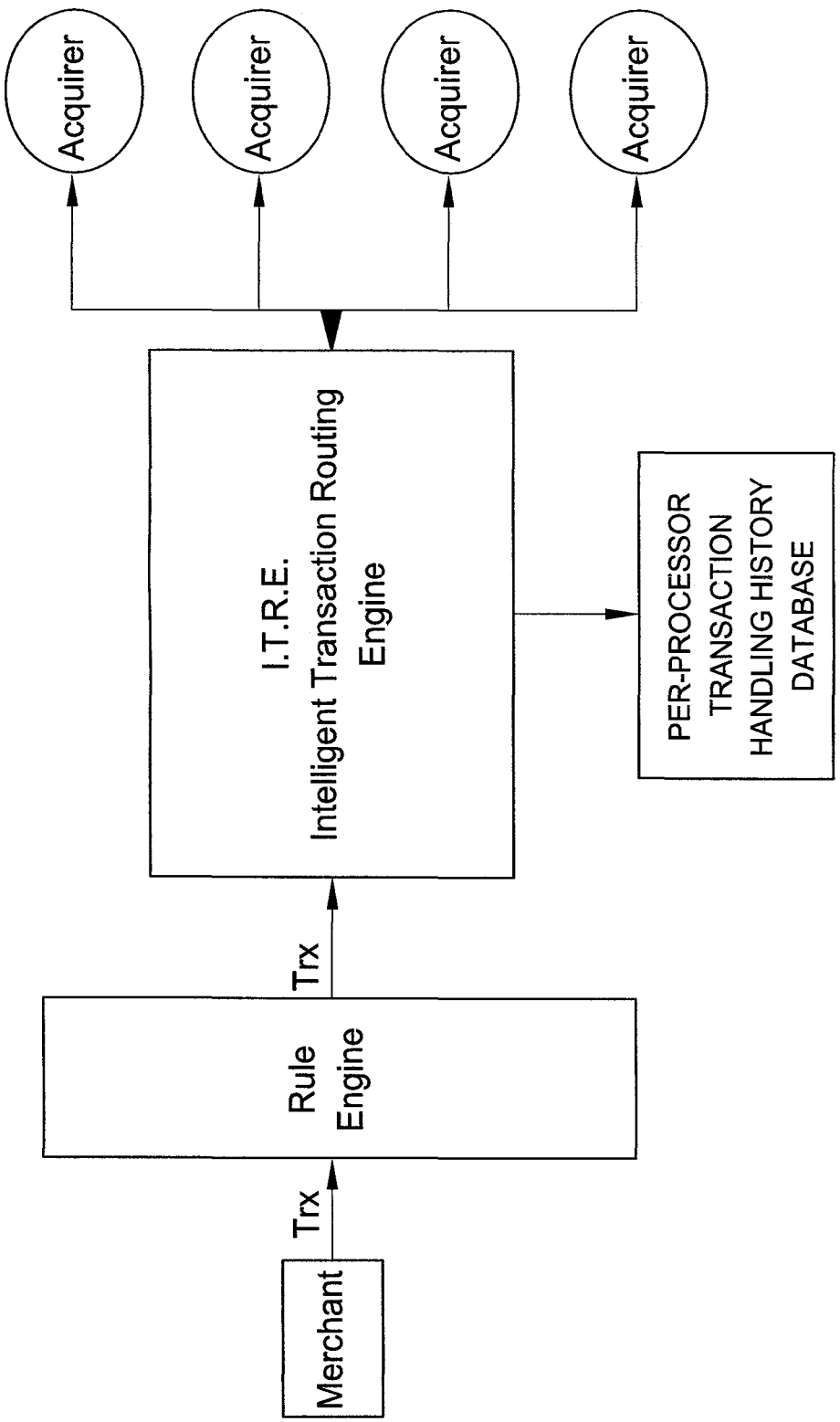
FIG. 1 is a simplified functional block diagram illustration of an Intelligent Transaction Routing System according to an embodiment of the present invention.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's steps, including a mobile application, platform or operating system e.g. as stored in a medium, as well as combining the computer program with a hardware device to perform some or all of the steps of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or offline; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

The following terms may be construed either in accordance with any definition thereof appearing in the prior art literature or in accordance with the specification, or as follows:

Service level agreement (SLA): digitally or otherwise represented agreement between customer/s and service provider/s. Service level agreements may include numerous service performance metrics to which the service provider commits. May include technical definitions of commitments to customer in terms of any or all of mean time between failures (MTBF), various data rates; throughput; jitter; and/or defined undertakings on percentage of network uptime, power uptime, number of scheduled maintenance windows, uptime, or any of all of the following: Abandonment Rate: Percentage of calls abandoned while waiting to be answered; Average Speed to Answer: Average time (usually in seconds) it takes for a call to be answered by the service desk; Time Service Factor: Percentage of calls answered within a definite timeframe, e.g., 80% in 20 seconds; First-Call Resolution: Percentage of incoming calls that can be resolved without the use of a callback or without having the caller call back the helpdesk to finish resolving the case; Turn-Around Time: Time taken to complete a certain task; Mean Time To Recover: Time taken to recover after an outage of service.

Acquirer—e.g. "payment processor" or "payment handler". A software platform that processes financial, such as credit card, and other transactions online. Example acquirers are run by PayVision and Adyen. Payment processor platforms may enable merchants to receive debit or credit card payments online e.g. by evaluating whether transactions are valid and approved, using anti-fraud measures to assure that a purchase transaction is initiated by the claimed source. Processors typically use rules e.g. regarding fraud, chargebacks, and identity theft. Typically, an acquirer processes credit or debit card payments or other transactions on behalf of a merchant or other user e.g. by accepting or acquiring credit card payments from card-issuing computerized institutions. The acquirer typically assigns each merchant a merchant account then electronically exchanges funds (say) with issuing institutions on behalf of the merchant or other user, and may transfer electronic payment to the merchant for its daily payment-card activity.

ACH—(Automated Clearing House) A computerized system (e.g. of the U.S. Federal Reserve Bank) that provides electronic funds transfer (EFT) between banks. Typically, ACM operations are done in a batch mode, which can take hours or days before the money is actually transmitted. A return notification may be sent if there are insufficient funds in the account.

Application-Programming Interface (API): software-to-software interface defining how software applications communicate in background, typically including a set of programming instructions and standards for accessing a web-based software application. Typically, a first software application communicates with a remote application over the Internet using API calls between the applications which are managed using protocols such as but not limited to XML. Typically, each API comprises a chunk of software code including a series of XML messages each of which corresponds to a different function of the remote service.

Heartbeat: periodic signal generated by hardware or software and sent between machines typically at a regular interval e.g. in the order of seconds. If a heartbeat is not received for, say, a few heartbeat intervals, the machine that should have sent the heartbeat is assumed by other machines to have failed.

KPI: performance indicator for a software system, such as but not limited to the following systems: Availability/Uptime, mean time between failures, mean time required to repair failures, and unplanned unavailability. KPIs' refresh frequency and review-frequency by the organization may be monthly, weekly, daily, and real-time.

FIG. 1 illustrates an Intelligent Transaction Routing System according to an embodiment of the present invention. The system typically comprises a software platform including a rule engine and associated, typically artificial intelligence (AI)-based, Transaction processing analyzer employing a database. The system serves computerized merchant entities or other end-users which seek to route transactions (or other services) to supported payment processors/acquirers (or other computerized service providers).

The rule engine, which may be associated with a merchant-rule generating user interface, is operative for receiving a flow of transaction data entities, using a processor for applying merchant-defined routing rules, if available, and routing each transaction data entity, for which at least one merchant-rule is true, to an external payment processor, as defined by the merchant-defined routing rule, from among the supported payment processors.

The transaction processing analyzer is operative to accumulate data characterizing the payment processors' current handling, of transaction data entities routed to respective payment processors by this system. The analyzer is also operative to compute, from the accumulated data, current statistics quantifying at least one aspect of handling quality characterizing each of the plurality of supported payment processors. The analyzer is also operative to route each transaction data entity for which no merchant-rules are true to a "best" payment processor selected from among said plurality of supported payment processors by applying predetermined aspect combining criteria which prioritize said aspects, to said statistics.

Any suitable technology, such as but not limited to an application-programming interface (API), may be employed to provide communication between a merchant (e.g. website) and the platform of FIG. 1 and between the platform and supported payment processors. Typically, the system of FIG. 1 is pre-integrated with each of many payment processors to be supported. Payment processor KPIs which the platform monitors, may for example include any or all of the following: Up/Down, Response time, acceptance rate, decline rates, riskScore, fraud and risk data. The platform of FIG. 1 typically checks the status (up or down) of each of the supported processors/acquirers by sending them a "Heartbeat" API call.

Typically, an API of each payment processor to be supported, is integrated into the system of FIG. 1, to allow data provided by a merchant using its API with the system of FIG. 1, to be stored and sent to a supported payment processor using that processor's API with the system of FIG. 1.

Each supported payment processor that has been integrated into the system of FIG. 1 has its own destination URI, to which API calls may be sent. Typically the transaction processing analyzer assigns a destination payment processor to each transaction entity. Since supported payment processor's URLs are incorporated into the code of the system of FIG. 1, the precise destination, in URI, terms, may be determined for each transaction entity.

Each time a transaction is initiated at any retail channel, the transaction processing analyzer typically assesses multiple consumer and payment processing parameters in real time, analyzing factors such as but not limited to any of the following: user IP address, BIN, global location, card type, device type, risk score, and determining the optimal acquirer or payment provider for the transaction.

According to certain embodiments, each time a new transaction comes in, the transaction processing analyzer compares the new transaction's characteristics to characteristics of past transactions already stored.

The transaction processing analyzer typically determines current characteristics of payment processors such as but not limited to some or all of: availability, fees, and decline rates. For example, the transaction processing analyzer may dynamically route the transaction through the available acquirer or payment provider most likely to accept the transaction for the lowest fee.

The transaction processing analyzer typically routes international payments through local acquirers globally to eliminate cross-border and currency conversion fees. Consumer and payment card country of origin may be detected so payment may be sent through local acquirers worldwide, avoiding foreign exchange fees and maximizing conversions.

The analyzer of FIG. 1 typically performs some or all of the following functionalities:

a. monitoring the acquirers/payment processors for downtime and/or latency.

b. Some or all transactions typically arrive at the analyzer (and are typically also stored by the analyzer in a suitable database). The analyzer accumulates transaction parameters including, optionally, collecting transaction "population" statistics and/or trends.

c. the results of each transaction's interaction with the acquirer to which the transaction is routed, are accumulated.

d. For each transaction the analyzer receives, the analyzer enters some or all transaction particulars into its logic, determines a suitable acquirer for that transaction, and routes the individual transaction to that acquirer. Any suitable analyzer logic may be employed, and may utilize as input, any or all of transaction parameters, responses from acquirers and merchant stipulations. For example, a merchant may stipulate that transactions are to go to the acquirer with the highest acceptance rate. Since the analyzer monitors how many transactions got approved or declined per processor/acquirer, the analyzer is able to decide, dynamically, where to route each transaction given the current dynamic comparative data from various acquirers and given each merchant's stipulations.

Typically, the analyzer receives all transactions and passes each individual transaction on to the right acquirer directly per the rule engine decision re that individual transaction if such a decision was made. If not, e.g., if the rule engine decided that the analyzer is to make the decision (e.g. because none of the merchant rules apply), the analyzer applies its own logic as described above.

The merchant stipulations allow the analyzer to be customized to support differing merchant priorities. For example, the analyzer's logic may assume (e.g. if so stipulated by an individual merchant or by default) that optimizing acceptance rate is more important than other considerations, in which case the system may route the transaction data entity to the system-supported payment processor with the highest acceptance rate. Alternatively, the analyzer's logic may assume (e.g. if so stipulated by an individual merchant or by default) that fees are most important, in which case the system may route to a system-supported payment processor providing better fees. Alternatively, the analyzer's logic may assume (e.g. if so stipulated by an individual merchant or by default) that a merchant needs to support a specific functionality e.g. the ability to refund transaction data entities, in which case the system may route the transaction data entity to the system-supported payment processor having refund capabilities, and so on. Alternatively or in addition, the merchant may implement the above priorities by defining suitable rules.

Any suitable rules and stipulations may be employed, for example:

a. transactions coming from Israel will always go through acquirer A whereas transactions from Canada are to be routed to Acquirer B b. transactions greater than $1000 go to the acquirer that gives the best per-transaction fee or better acceptance fee, all other transactions to acquirer Z c. transactions greater than $1000 go to Acquirer C, transactions less than $100 are to be routed to the acquirer that gives the best acceptance fee, all other transactions to acquirer Z.

Current acceptance rates and other statistics may be computed, to compare between processors, in any suitable manner and at any suitable interval, either fixed or variable, depending on load, criticality and other considerations. Each computation may be performed directly from the accumulated data characterizing current handling of each individual transaction data entity or may be performed by updating a previous computation at time t to reflect only handling of transaction data entities in the time window between time t and the current time. For example, since statistics such as acceptance rate change each time a transaction is sent to a processor/acquirer, the statistics may be re-computed each time a transaction is sent. Each computation typically takes into account a suitable "window" of current data such as the last week, last 30 days, last 90 days, last year or all transactions in which case computations may be based on the totality of all transactions stored.

According to certain embodiments, merchants may be assigned a default payment processor acquirer. For example, if a merchant has a prior commitment to a specific acquirer, this is setup in the system, such that all transactions for which no merchant rules are applicable, go directly to the merchant's default acquirer.

A suitable method for transaction routing, which may employ the system of FIG. 1, is now described in detail with reference to steps a-f in the simplified flowchart illustration of FIG. 2:

a. Typically, human programmers on behalf of each of a plurality of merchants (e.g. merchants conducting e-commerce via apps or websites) set up merchant-rules for each merchant, using the merchant-rule generating UI e.g. to conform to a merchant's prior agreements with specific payment processors. For example, a merchant might have committed to process 1 million transactions per month via a specific payment processor in Germany, by the name GeltProcess. The rule may be: "first million transactions are to be sent to GeltProcess."

Alternatively, a specific subset of transactions might be earmarked by a merchant for a specific payment processor in which case the relevant merchant-rule might be "transactions of less than 20 USD are to be sent to PayHere".

Merchant-Rules are typically of the form: if [CONDITION on data components of transaction data entity]=true), route transaction data entry to [external payment processor supported by merchant-rule engine]. Each merchant may pre-store its own business rules typically using as many KPIs as it needs (such as but not limited to any of: transaction amount, origin, currency).

b. one of a population of end-users presents credit card to merchant or other computerized entity, or otherwise initiates a transaction with the merchant/entity.

c. responsively, the merchant generates a transaction data entity having data components for storing transaction components/particulars.

d. merchant sends the transaction data entity (or certain transaction data entity components, e.g. Transaction Id, Amount, tax, Fees. Invoice particulars, user particulars, credit card particulars) to the platform of FIG. 1. The transaction data entity is received by the rule engine.

e. rule engine routes certain transactions (typically, all transactions to which at least one merchant-defined or other legacy rule applies) to external payment processors accordingly. Each individual transaction may be sent to the payment processor stipulated in the first rule whose condition is true for the individual transaction, or pre-programmed logic (or random selection) may be used to select a payment processor for an individual transaction which complies with a plurality of rules corresponding to a plurality of different payment processors. The rule engine uses the rules to decide whether they apply to the transaction in the current situation, in which case the rules may be employed to route the transaction directly to a specific acquirer ("payment processor) or to the FUR Engine. However, typically, all transactions are passed from the rule engine to an internal intelligent payment routing subsystem, also termed herein the "Transaction processing analyzer" or Intelligent Transaction Routing (ITR) engine. Alternatively, the rule engine routes only transactions which fail all merchant-rules, hence are not routed by the rule engine to any external payment processor, to the analyzer.

It is appreciated that the rule engine may not have any rule to execute e.g. if no rules are available because the relevant merchant has not pre-defined same, in which case the transaction processing analyzer may take over.

f. The transaction processing analyzer uses system-rules to route each transaction not routed by the rule engine, to one of the payment processors. Typically, the transaction processing analyzer is operative to accumulate data characterizing current handling, by respective processors from among the plurality of supported payment processors, of at least transaction data entities routed to said respective processors by this system, and the system rules are based on this accumulated data. Data may be based on processor responses; typically, each time a transaction is routed to an acquirer, the acquirer sends back a response which typically comprises either transaction approved, transaction declined, or time-out. Typically, the transaction processing analyzer is operative to use this accumulated data to generate current statistics quantifying at least one aspect of handling quality characterizing each of the plurality of supported payment processors, and to route each transaction data entity for which no merchant-rules are true to a "best" payment processor selected from among said plurality of supported payment processors using system rules in which predetermined aspect combining criteria, which prioritize said aspects, are applied to the statistics.

The system of FIGS. 1-2 is typically PCI compliant.

A particular advantage of certain embodiments is optimization of performance, while ensuring flexibility and/or while minimizing processing costs and/or decline rates, and/or while maximizing cross-channel conversion rates.

A further particular advantage of certain embodiments is that computerized merchant entities can both maintain a legacy set of constraints e.g. existing acquirer relationships and/or existing negotiated fees and/or existing service level agreements (SLAB), while enhancing their existing infrastructure and global processing capabilities with acquirer redundancy.

A yet further particular advantage of certain embodiments is in enabling computerized merchant entities to integrate with multiple acquirers.

Yet another particular advantage of certain embodiments is ability to route payments between multiple acquirers so as to ensure transactions convert even if a merchant's regular acquirer is currently likely to decline a particular transaction or is currently experiencing downtime.

It is appreciated that the system shown and described herein has a wide variety of applications which is in no way limited to credit card transactions or bank transfers. Each transaction data entity may for example represent a transaction between a credit card holder and a merchant with whom the holder initiates the transaction, but this is not intended to be limiting. The system shown and described herein is applicable mutatis mutandis to any layer of computerized entity subcontracting a flow of jobs, in background, on behalf of respective end-users, to subcontracting service providers such as external payment providers, in the illustrated embodiment, or alternatively to computer storage providers, communication service providers, data search providers, and the like. The system is particularly suited to applications in which services, such as digital services, may be performed off-shore and need not be physically proximal to the end-user of the system.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the steps or operations of any of the methods shown and described herein, in any suitable order including simultaneous performance of suitable groups of steps as appropriate; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including at least one processor and/or cooperating input device and/or output device and operative to perform e.g. in software any steps shown and described herein; information storage devices or physical records, such as disks or hard drives, causing at least one computer or other device to be configured so as to carry out any or all of the steps of any of the methods shown and described herein, in any suitable order; at least one program pre-stored e.g. in memory or on an information network such as the Internet, before or after being downloaded, which embodies any or all of the steps of any of the methods shown and described herein, in any suitable order, and the method of uploading or downloading such, and a system including server/s and/or client's for using such; at least one processor configured to perform any combination of the described steps or to execute any combination of the described modules; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may if desired be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including method steps, which are described in the context of separate embodiments may also be provided in combination in a single embodiment. For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited, to those described in the Background section or in publications mentioned therein.

Conversely, features of the invention, including method steps, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the steps illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A computer-implemented method comprising:
   receiving a request to initiate a first transaction from a merchant, the request including a first transaction data entity associated with the first transaction, the first transaction data entity including one or more transaction data entity components, the request further including information identifying the merchant, using a processor to identify one or more pre-imposed routing rules associated with the merchant;
   determining that none of the one or more pre-imposed routing rules associated with the merchant is applicable to the first transaction data entity;
   identifying, using a transaction processing analyzer, at least a first system rule;
   analyzing, using the at least first system rule, the first transaction in view of current payment processor statistics stored in a datastore, wherein the at least first system rule comprises a rule specifying an up/down status and wherein the datastore of current payment processor statistics includes statistics quantifying up/down status of each of a plurality of payment processors, and wherein the statistics quantifying up/down status are gathered by proactively requesting, by generating API calls to each of the plurality of payment processors, data characterizing a handling of each of a plurality of transactions by the plurality of payment processors and storing the data characterizing the handling in the datastore;
   determining which payment processor among the plurality of payment processors to route the first transaction based on the analysis;
   routing the first transaction data entity to the selected payment processor for authorization processing of the first transaction; and
   receiving an authorization response from the selected payment processor.

2. The computer-implemented method of claim 1 further comprising:
   at least a second system rule specifying an acceptance rate;
   wherein the datastore of current payment processor statistics include statistics quantifying a current acceptance rate for each of the plurality of payment processors.

3. The computer-implemented method of claim 1, wherein the datastore of current payment processor statistics includes response-time statistics comprising at least one statistic characterizing a distribution of a payment processor's response times to incoming transactions.

4. The computer-implemented method of claim 1, further comprising:
   proactively requesting, from the plurality of payment processors, data characterizing a handling of each of a plurality of transactions by the plurality of payment processors; and
   storing the data characterizing the handling in the datastore.

5. The computer-implemented method of claim 1, further comprising accumulating the statistics quantifying up/down status, the method comprising:
   sending API calls to each of the payment processors;
   setting a payment processor's status as currently operational if a predetermined number of consecutive API calls receive a response from the payment processor; and
   setting the payment processor's status as currently not operational if the predetermined number of consecutive API calls fail to receive a response from the payment processor.

6. The computer-implemented method of claim 5, further comprising:
   in the event that an API call fails to receive a response from a payment processor within a predetermined time period, sending an additional API call to the payment processor.

7. The computer-implemented method of claim 6, further comprising:
   updating the datastore of current payment processor statistics to indicate the payment processor is in a down-state after a predetermined number of API call attempts have been made.

8. The computer-implemented method of claim 1, wherein the transaction processing analyzer is further operative to execute a Bayesian algorithm which inputs a plurality of parameters characterizing the first transaction and at least one parameter characterizing each of at least some of said plurality of payment processors and outputs a selected processor from among said plurality of payment processors to which the first transaction is to be routed.

9. The computer-implemented method of claim 1, further comprising a user interface displaying the pre-imposed routing rules associated with a merchant, the pre-imposed routing rules including elements selected or otherwise provided by the merchant.

10. The computer-implemented method of claim 9, wherein at least one of the pre-imposed routing rules associated with the merchant is a rule to determining whether one or more characteristics of a transaction or one or more characteristics of a payment processor is true.

11. The computer-implemented method of claim 5, wherein the API calls are sent periodically to each of the plurality of payment processors.

12. A non-transitory computer readable storage medium having instructions stored thereon that, when executed on a processor, perform a method comprising:
   receiving a request to initiate a first transaction from a merchant, the request including a first transaction data entity associated with the first transaction, the first transaction data entity including one or more transaction data entity components, the request further including information identifying the merchant, using a processor to identify one or more pre-imposed routing rules associated with the merchant;
   determining that none of the one or more pre-imposed routing rules associated with the merchant is applicable to the first transaction data entity;

identifying, using a transaction processing analyzer, at least a first system rule;

analyzing, using the at least first system rule, the first transaction in view of current payment processor statistics stored in a datastore, wherein the at least first system rule comprises a rule specifying an up/down status and wherein the datastore of current payment processor statistics includes statistics quantifying up/down status of each of a plurality of payment processors, and wherein the statistics quantifying up/down status are gathered by proactively requesting, by generating API calls to each of the plurality of payment processors, data characterizing a handling of each of a plurality of transactions by the plurality of payment processors and storing the data characterizing the handling in the datastore;

determining which payment processor among the plurality of payment processors to route the first transaction based on the analysis;

routing the first transaction data entity to the selected payment processor for authorization processing of the first transaction;

receiving an authorization response from the selected payment processor.

13. The non-transitory computer readable storage medium of claim 12 further comprising instructions that perform the method comprising:

transmitting the authorization response to the merchant, the authorization response one of (i) an transaction approval, and (ii) a transaction denial.

14. A system, comprising:

a communication device to receive a request to initiate a transaction;

a processor coupled to the communication device; and a computer storage device in communication with the processor and storing instructions adapted to be executed by the processor to:

receiving a request to initiate a first transaction from a merchant, the request including a first transaction data entity associated with the first transaction, the first transaction data entity including one or more transaction data entity components, the request further including information identifying the merchant, using a processor to identify one or more pre-imposed routing rules associated with the merchant;

determining that none of the one or more pre-imposed routing rules associated with the merchant is applicable to the first transaction data entity;

identifying, using a transaction processing analyzer, at least a first system rule;

analyzing, using the at least first system rule, the first transaction in view of current payment processor statistics stored in a datastore, wherein the at least first system rule comprises a rule specifying an up/down status and wherein the datastore of current payment processor statistics includes statistics quantifying up/down status of each of a plurality of payment processors, and wherein the statistics quantifying up/down status are gathered by proactively requesting, by generating API calls to each of the plurality of payment processors, data characterizing a handling of each of a plurality of transactions by the plurality of payment processors and storing the data characterizing the handling in the datastore;

determining which payment processor among the plurality of payment processors to route the first transaction based on the analysis;

routing the first transaction data entity to the selected payment processor for authorization processing of the first transaction;

receiving an authorization response from the selected payment processor.

* * * * *